(12) United States Patent
Parker et al.

(10) Patent No.: US 11,969,756 B2
(45) Date of Patent: Apr. 30, 2024

(54) SYSTEMS AND METHODS FOR APPLYING COATINGS TO BRAKE ROTORS

(71) Applicant: Brake Parts Inc. LLC, McHenry, IL (US)

(72) Inventors: David William Parker, McHenry, IL (US); Nathaniel Kinkley, McHenry, IL (US); Chao Pan, Crystal Lake, IL (US)

(73) Assignee: Brake Parts Inc, McHenry, MI (US)

( * ) Notice: Subject to any disclaimer, the term of this patent is extended or adjusted under 35 U.S.C. 154(b) by 0 days.

(21) Appl. No.: 18/078,697

(22) Filed: Dec. 9, 2022

(65) Prior Publication Data

US 2023/0182169 A1    Jun. 15, 2023

Related U.S. Application Data

(60) Provisional application No. 63/287,881, filed on Dec. 9, 2021.

(51) Int. Cl.
*B05D 3/02*    (2006.01)
*B05D 3/00*    (2006.01)
*B05D 7/00*    (2006.01)

(52) U.S. Cl.
CPC ............. *B05D 7/54* (2013.01); *B05D 3/002* (2013.01); *B05D 3/0254* (2013.01); *B05D 2301/10* (2013.01)

(58) Field of Classification Search
CPC ........ B05D 7/54; B05D 3/002; B05D 3/0254; B05D 2301/10
USPC ...................................... 106/31.01
See application file for complete search history.

(56) References Cited

U.S. PATENT DOCUMENTS

2003/0089564 A1 *  5/2003  Uehara ............. C25D 11/36
                                              188/218 XL

FOREIGN PATENT DOCUMENTS

KR    100955588 B1 *  4/2010
TW    524933 B    *  3/2003
WO    WO-2017099025 A1 *  6/2017 ............. C23C 22/07

* cited by examiner

*Primary Examiner* — James E McDonough

(57) ABSTRACT

This disclosure relates to improved systems and methods for applying coatings to brake rotors. The systems, methods, and techniques described in this disclosure facilitate application of both pretreatment coatings and protective coatings to brake rotors. Other embodiments are disclosed herein as well.

14 Claims, 3 Drawing Sheets

SYSTEMS AND METHODS FOR APPLYING COATINGS TO BRAKE ROTORS

CROSS-REFERENCE TO RELATED APPLICATIONS

This application claims benefit of, and priority to, U.S. Provisional Application No. 63/287,881 filed on Dec. 9, 2021, which is herein incorporated by reference in its entirety.

TECHNICAL FIELD

The present disclosure is related to brake rotors and, more particularly, to systems and methods for applying coatings a brake rotor.

BACKGROUND

Disk brake assemblies are commonly used for slowing or stopping the rotation of a wheel of a vehicle. A typical disk brake assembly includes a brake rotor coupled to the wheel or an axle of the vehicle. In addition, the brake rotor assembly can include a caliper that is positioned on a portion of the brake rotor. The caliper can include pistons and brake pads which are positioned on opposite sides of the caliper. Surfaces of the brake pads are positioned adjacent to a surface of the brake rotor. The pistons operate the brake pads between braking and non-braking positions. During operation, the pistons operate a respective brake pad to engage a surface of the brake rotor to mitigate the brake rotor from rotating, thereby slowing rotation of the wheel to slow the vehicle.

Brake rotors are commonly made from cast iron due to cast iron's high thermal conductivity, machinability, and durability. Cast iron can become corroded when exposed to various environmental elements, such as moisture, road salt, and/or chemicals found on road surfaces. When a brake rotor becomes corroded, the brake rotor assembly can cause safety concerns. For example, a corroded brake rotor reduces the friction between the brake rotor and the brake pads, produces unwanted noise when braking, and increases the risk of the brake rotor slipping between the brake pads.

Additionally, in many recent automobile designs, the brake rotor assembly is designed to be exposed and visible. For example, a recent trend has emerged in which a hollow wheel hub exposes the brake rotor assembly to be visible from the exterior of the vehicle. This design increases the risk of corroding the brake rotor further by reducing the amount of coverage typically seen from vehicle wheels that include hubcaps.

One common technique for preventing the corrosion of brake rotor assemblies involves applying protective coatings, such as paint coatings, to the brake rotor. Notably, however, paint coatings can only be applied to the surfaces of the brake rotor that do not engage the brake pads because applying paint in those regions would result in smoking and degrade performance of the braking system. Consequently, those portions of the brake rotor that engage the brake pads typically are not decorated or ornamented with coloring, nor are they protected with a protective coating.

BRIEF DESCRIPTION OF DRAWINGS

To facilitate further description of the embodiments, the following drawings are provided, in which like references are intended to refer to like or corresponding parts, and in which.

Figure 1:
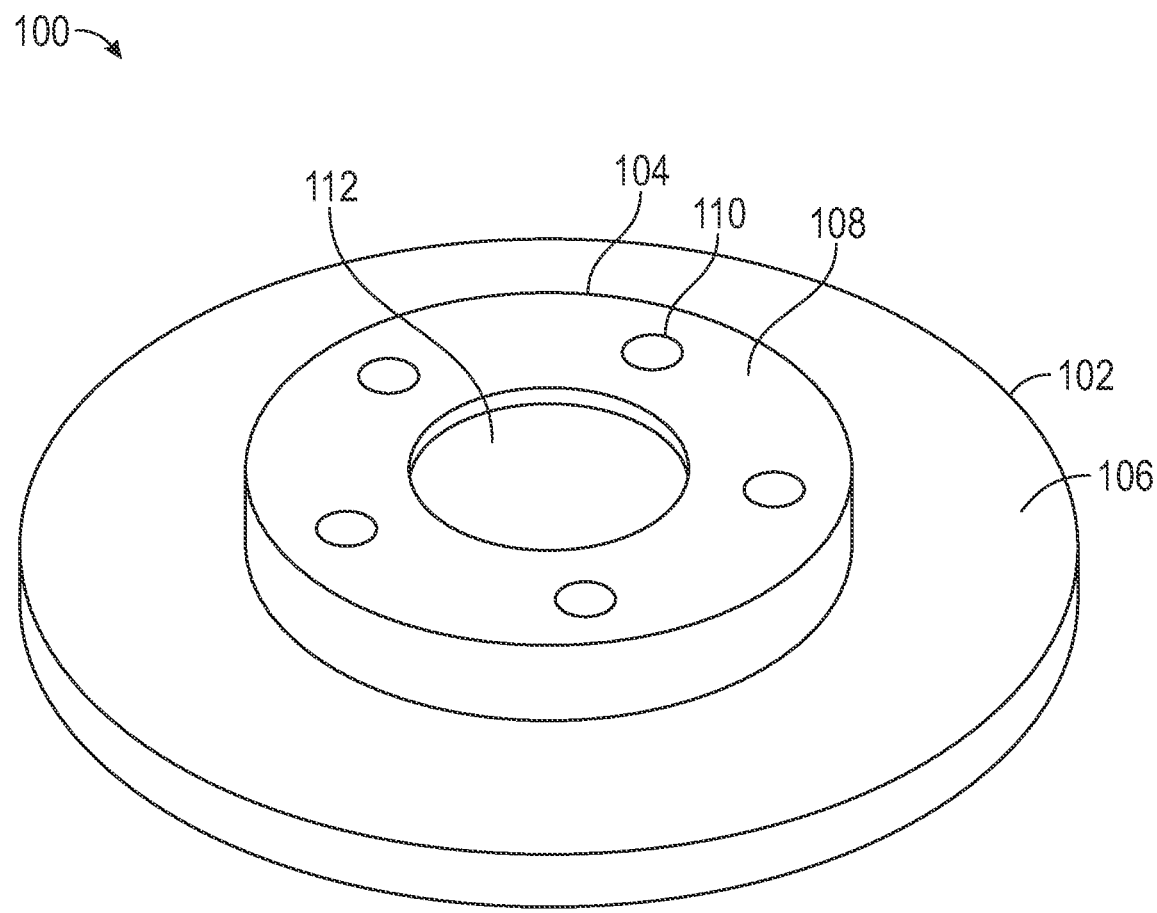
FIG. 1 is a top perspective view of an exemplary brake rotor according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION OF EXEMPLARY EMBODIMENTS

The present disclosure is related to improved systems, methods, and assemblies for applying coatings to brake rotor assemblies and components. The techniques disclosed herein can be used to selectively apply both pretreatment coatings (e.g., phosphate or phosphorous-based coatings) and protective coatings (e.g., paint coatings, water-based coatings, solvent-based coatings, zinc-based coatings, etc.) to brake rotors. The manner in which these coatings are applied enables the brake rotors to be ornamented with various colors, and serves to protect the brake rotors from corrosion.

The improved coating techniques disclosed herein permit a phosphate-based pretreatment coating to be applied to the entirety of a brake rotor and a paint coating (and/or other protective coating) to be selectively applied to certain portions of the brake rotor on top of the phosphate coating. One or more masking structures can be utilized to cover or prevent a paint coating or other protective coating from being applied to surfaces of the brake rotor that are intended to engage brake pads, while permitting the paint coating or protective coating to be applied to other surfaces of the brake rotor (e.g., fastening surfaces used to couple the brake rotor to a wheel or axle of a vehicle). Additionally, a coating preparation process can be utilized to prepare the pretreatment coating in manner that enables color or ornamentation to be applied to the surfaces of the brake rotor that are intended to engage brake pads.

In certain traditional processes, a phosphate coating is applied to specific portions of the brake rotor and this enables paint to be adhered to the brake rotor. However, the portion of the brake rotor that engages the brake pads is not painted because doing so can cause smoking and other negative effects. As such, traditional processes only coat the surfaces of the brake rotor that are coupled to the wheel or axle of the vehicle. Consequently, the surfaces of the brake rotor that engage the brake pads are not ornamented, nor are they protected from corrosion.

In embodiments disclosed herein, a phosphate coating (or other pretreatment coating) is applied to the entirety of the brake rotor, and a masking structure can be placed over certain portions of the brake rotor (e.g., the surfaces that are intended to engage brake pads) to prevent paint from being applied to the those portions. This permits the phosphate to be visible on the brake rotor and, in particular, the portion of the brake rotor that engages the brake pads. The color of the phosphate coating can be tailored or customized using a coating preparation process to produce a desired coloring on the region of the brake rotor that engages the brake pads. The coating preparation process can vary the percentage of phosphate and heating specifications (e.g., the temperature and/or heating duration) to change the coloring of the phosphate coating. In some embodiments, the heating specifications and phosphate percentages can be customized to produce a blueish color. Various shades of blue and/or other colors also can be applied.

The ability to apply the protective coating to the entire brake rotor improves the life of the brake rotor, the operation of a brake rotor assembly, and the corrosion resistance of the brake rotor. The techniques described herein provide the additional benefit of allowing color and/or ornamentation to be applied to the brake rotors using the pretreatment coating.

The embodiments described in this disclosure can be combined in various ways. Any aspect or feature that is described for one embodiment can be incorporated to any other embodiment mentioned in this disclosure.

FIG. 1 discloses an exemplary brake rotor 100 according to certain embodiments. The brake rotor 100 illustrated in this drawing is intended to demonstrate, inter alia, how the coating methods and systems described herein can be applied according to certain embodiments. However, the techniques and principles described herein can be applied to brake rotors 100 having various structures and configurations other than those illustrated in this drawing. Additionally, the coating methods can be applied to additional locations and/or components of a vehicle other than those explicitly mentioned herein.

The brake rotor 100 includes a bottom portion 102 and a top portion 104. The bottom portion 102 includes an engagement surface 106. The top portion 104 includes a fastening surface 108, which comprises apertures 110 and an opening 112. The engagement surface 106 can extend to or cover the front surfaces and back surfaces (not visible) of the bottom portion 102 of the brake rotor 100. The engagement surface 106 includes a lower annular disk portion of the brake rotor 100. The fastening surface 108 can extend to the front surfaces and back surfaces (not visible) of the top portion 104 of the brake rotor 100. The fastening surface 108 includes the upper annular disk portion of the brake rotor 100.

In some embodiments, the apertures 110 are configured to receive wheel studs (not shown) and/or other connectors which can be used to secure the brake rotor 100 to a vehicle. For example, in some cases, the apertures 110 can receive wheel studs that extend outwardly from an axle. The opening 112 can receive the axle (not shown) of a vehicle, thereby coupling the brake rotor 100 to the vehicle.

During operation, the engagement surface 106 (or portion thereof) can be positioned within a caliper between two brake pads. The brake pads may engage the engagement surface 106 to slow rotation of the brake rotor 100. For example, the brake pads can be hydraulically operated to engage the engagement surface 106.

Over time, the brake rotor 100 can deteriorate due to interaction with the brake pads and/or due to corrosive agents (e.g., such as environmental elements and/or chemicals on road surfaces). For example, a layer of corrosion (e.g., rust) can form on the engagement surface 106 due to the brake rotor 100 being exposed to moisture and/or other materials from a road surface.

To mitigate corrosion and deterioration, embodiments disclosed herein can apply a phosphate coating to the brake rotor 100 in preparation of more durable protective coatings. In particular, the phosphate coating can be applied to both the engagement surface 106 and the fastening surface 108, and a protective coating, such as a paint coating, can be applied be applied to the fastening surface 108. In some instances, the protective coating can alternatively, or additionally, include a zinc coating, which can be applied to both the engagement surface 106 and the fastening surface 108.

A coating preparation process can be used to vary the color or appearance of the phosphate coating. The coating preparation process can vary certain parameters, such as the heating temperature, heating duration, phosphate material, and/or percentage of phosphate, to produce a desired color. In some embodiments, the coating preparation process also can vary parameters indicating the pH (potential hydrogen) of heating, cleansing and/or rinsing liquids that are applied to the brake rotor 100 to vary the color.

In some embodiments, an iron phosphate coating comprising 4-5% phosphate (and/or the brake rotor itself) can be heated at a temperature of approximately 85 degrees Fahrenheit with an exposure time of approximately 2 minutes to produce a coating with a blueish appearance. In this scenario, the process of applying the coating my involve applying the brake rotor 100 to liquids, which can have a pH range of 7-9. In some embodiments, the application of the phosphate coating to the brake rotor 100 results in a transformation from an appearance of a grey color to an appearance of a blue color.

The aforementioned parameters can be varied to produce other desired colors. Other temperatures, heating durations, and/or percentages can be used to produce other colors or appearances. For example, in some cases, a lower temperature range and a shorter heating duration can result in a different appearance of color.

Figure 2:
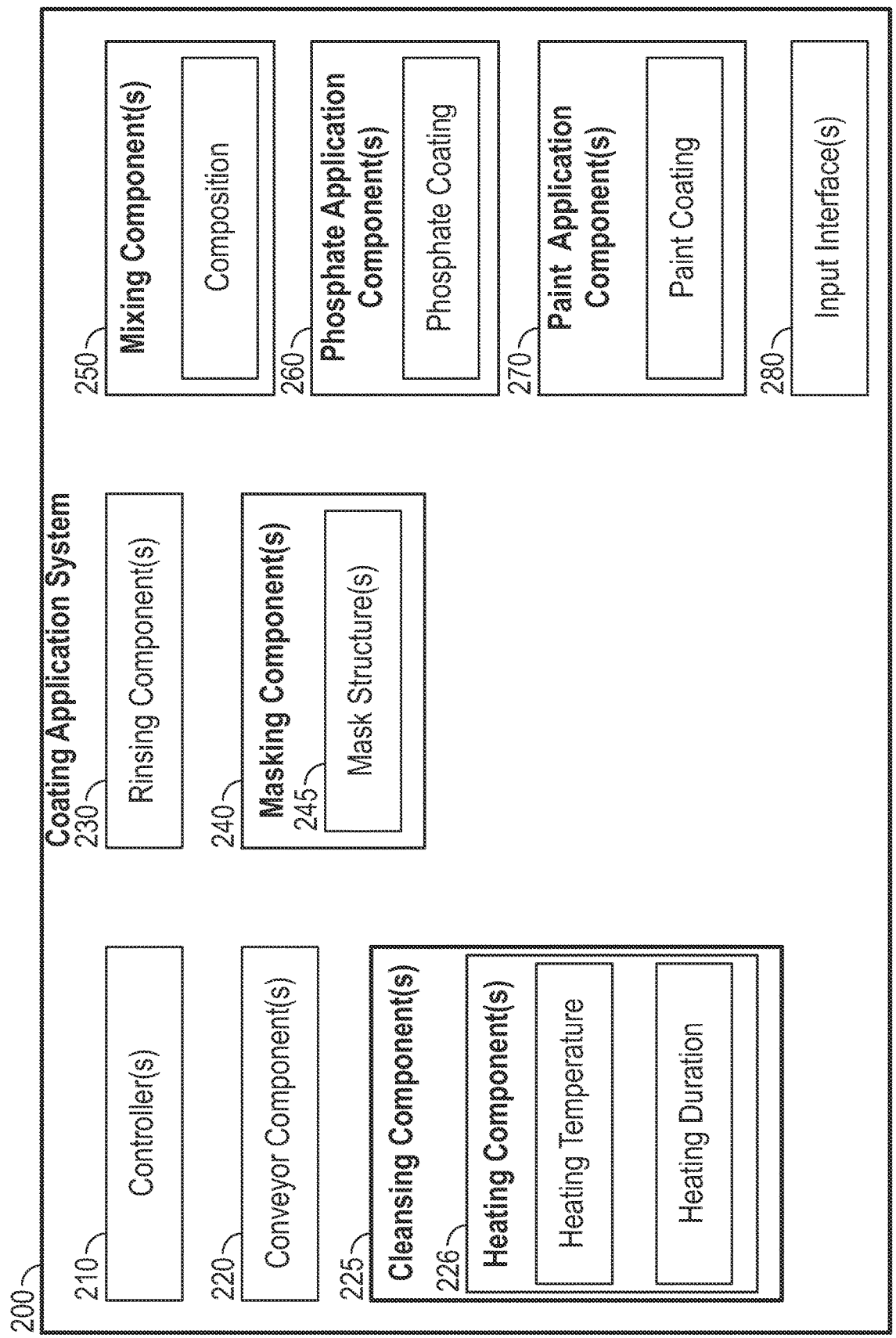
FIG. 2 is a diagram of an exemplary system according to certain embodiments.

FIG. 2 is a diagram of an exemplary coating application system 200 in accordance with certain embodiments. The coating application system 200 operates to apply a phosphate coating to the brake rotor 100 to vary the appearance or color the of the phosphate coating. The coating application system 200 can apply the phosphate coating to both the engagement surface 106 and the fastening surface 108 of the brake rotor 100.

The coating application system 200 utilizes a coating preparation process to vary the color or appearance of the phosphate coating. The coating preparation process utilized by the coating application system 200 can vary the color or appearance of the phosphate coating by customizing or adjusting various settings or parameters including: 1) the applied heating temperature; 2) the heating duration or exposure time; 3) the type of phosphate material used in the coating; 4) the percentage of phosphate in the coating; and 5) pH levels of liquids during the preparation process. These factors can be varied to produce a desired color.

The values of the aforementioned settings or parameters can vary based on a desired color of the phosphate coating for the brake rotor 100. In some instances, the heating temperature of the brake rotor 100 can be 85 degrees Fahrenheit (or in a range of 80-90 or 75-100 degrees Fahrenheit). The heating duration can refer to the exposure period after the brake rotor is and after the phosphate coating is applied to the brake rotor 100, but before the brake rotor 100 is allowed to cool. In some embodiments, the heating duration can be approximately two minutes or in a range of thirty seconds to fifteen minutes or in range two to twelve minutes. The phosphate material applied to the brake rotor also can impact the color of the phosphate coating applied to the brake rotor. In some cases, the phosphate material may be iron phosphate. Alternatively, or additionally, manganese phosphate and/or zinc phosphate may be used. The percentage of phosphate included in the phosphate material also can be varied to impact the color, and may be in the range of 4-5% or 2-7% in some instances. As explained in further detail below, the brake rotor 100 may applied to liquids as part of heating, cleaning and/or rinsing process. In these scenarios, the pH of the liquids can impact the color of the phosphate coating. In some instances, the liquid(s) can have a pH in a range of 7-9 or 6-10.

In certain embodiments, the coating application system 200 comprises a controller 210, conveyor components 220, a cleaning component 225, a rinsing component 230, a masking component 240, a mixing component 250, a phosphate application component 260, a paint application component 270, and an input interface 280. In some cases, the coating application system 200 can include more than one of some or all of these components.

The controller 210 can be configured to execute any computer program instructions associated with implementing the functionalities of the coating application system 200 described throughout this disclosure. The controller 210 can include one or more programmable logic controllers (PLCs), one or more processing devices and may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more PLCs can include digital and/or analog PLCs.

In certain embodiments, the controller 210 can be a single control unit that communicates with and controls all of the components of the coating application system 200. In other embodiments, the controller 210 can include separate control units, each of which separately control one or more of the components of the coating application system 200.

In certain embodiments, the controller 210 can include, or communicate with, an input interface 280 that enables users to manage, manipulate, and/or control various aspects of the coating application system 200. The input interface 280 can include can include one or more graphical user interfaces (GUI) and/or one or more hardware interfaces (e.g., each of which comprises buttons, levers, switch, dials, or the like). The input interface 280 can permit users to activate/deactivate the coating application system 200, activate/deactivate specific components of the coating application system 200, adjust settings of the coating preparation process, specify desired colors to be applied to rotors, and/or control other settings associated with the coating application system 200.

The controller 210 can control or customize any components of the coating application system 200 to achieve a desired color of the brake rotor 100. For example, the controller 210 can receive inputs related to a desired color of the brake rotor (e.g., via input interface 280) and operate the components of the coating application system 200 to achieve the desired color of the brake rotor 100. In some cases, controller 210 can store a plurality of pre-saved control settings, each of which is configured to operate the components of the coating application system 200 to achieve desired colors of the brake rotor 100 (e.g., a first setting for producing blue hue, a second setting for producing a yellow hue, a third setting for purple hue, a fourth setting for producing a gold hue, etc.). Each of the pre-saved control settings can store information (e.g., such as heating temperature, the heating duration, phosphate material type, and the percentage of phosphate) to produce a specific color.

The conveyor components 220 can include one or more conveyor systems (e.g., conveyor belts, hanging track systems, etc.) that move a brake rotor 100 through various processing stages. For example, the conveyor components 220 that link together the rinsing component 230, masking component 240, mixing component 250, phosphate application component 260, and paint application component 270. The conveyor components 220 can transport the brake rotor 100 to these components during the coating application process.

In one embodiment, the conveyor components 220 can include a combination of a hanging track system and conveyor belt system. In such an embodiment, the conveyor belt system transports the brake rotor 100 to positions near the cleansing component 225, rinsing component 230, the masking component 240, the mixing component 250, the phosphate application component 260, and/or the paint application component 270 throughout the various stages of the coating application process. The hanging track system includes grabber device that can remove the brake rotor 100 from the conveyor belt, and manipulate the brake rotor such that is can be processed by the components of the coating application system 200. For example, the hanging track system can move the brake rotor 100 to engage the cleaning and rinsing components. The various processing stages of the coating application process are described below.

The cleansing component 225 can initially clean and/or remove contaminants from a brake rotor 100. The cleansing component 225 can include a bath structure that is filled with a liquid (e.g., water and/or other liquid). In some scenarios, the pH of the liquid can be in a range of 7-9 pH. The brake rotor 100 can be placed into the liquid within the bath structure to facilitate cleaning of the brake rotor 100.

The cleansing component 225 can include a heating component 226 that is configured to heat the liquid in the bath structure. Placing the brake rotor 100 into the heated liquid can change or stabilize the temperature of the brake rotor to a desired temperature. In some embodiments, the heating component 226 can heat the liquid to approximately 85 degrees Fahrenheit (or in a range of 80-90 or 75-100 degrees Fahrenheit) before being transferred to the phosphate application component 260 for the application of a phosphate coating. The heating component 226 can heat the liquid of the cleaning component 225 using any suitable heating mechanism. In some embodiments, the heating component 226 can heat the liquid include heated coil systems, burner systems, and/or other heating mechanisms to heat the liquid. In some scenarios, heating of the liquid may not be necessary (e.g., if the liquid is naturally at a desired temperature).

In some embodiments, the heating component 226 can heat the liquid in the cleaning component 225 to a specific temperature based on the specifications of a coating application process. One of the factors that can be used to adjust a color of the brake rotor relates to the heating temperature applied to the brake rotor 100. Thus, the temperature at which the brake rotor 100 is heated can vary based on desired colors.

The phosphate application component 260 applies the phosphate coating to the brake rotor 100. The manner in which the phosphate application component 260 applies the phosphate coating to the brake rotor 100 can vary. In some cases, the phosphate application component 260 can spray the phosphate coating onto the brake rotor 100. Additionally, or alternatively, phosphate application component 260 can dip the brake rotor 100 into a bath structure that includes the phosphate coating and/or the phosphate application component 260 can pour the phosphate coating onto the brake rotor 100.

The phosphate application component 260 can apply coatings comprising different types of phosphate materials to the brake rotor. Exemplary phosphate materials for the coating may include iron phosphate, manganese phosphate, and zinc phosphate. Other phosphate materials also may be used.

The application of the phosphate coating cleans the surface of the brake rotor 100 and displaces other foreign material in the grain of the surface of the brake rotor 100 that were not removed by the cleansing component 225. Additionally, application of the phosphate eliminates the need for an oil coating to protect any non-painted surfaces of the brake rotor 100. The elimination of the oil coating improves the preparation and installation of the brake rotor 100 on a vehicle because the oil does not need to be removed before installation.

As mentioned above, the type of phosphate material used, as well as the percentage of phosphate included in the material, can impact the color that is being applied to the brake rotor 100. Thus, both the phosphate material and percentage of the phosphate can be varied to achieve a desired color.

The rinse component 230 can receive the brake rotor 100 after the phosphate coating is applied to the brake rotor. The rinse component 230 can cool the brake rotor 100 and remove excess phosphate coating. In some embodiments, the rinse component 230 can include a bath structure containing a liquid (e.g., water) and the brake rotor 100 may be placed in the liquid for cooling and removal of the excess coating. The pH of the liquid can be in a range of 7-9 in some instances.

As mentioned above, the heating duration of the brake rotor is another factor that can impact the color applied to the rotor. When the phosphate coating is applied to the brake rotor 100 by the phosphate application component 260, this can mark the beginning of the heating duration. Once the phosphate coating is applied to the heated brake rotor, a reaction process will occur. When the brake rotor 100 is cooled by the rinse component 230, this can stop or begin to slow the reaction of the phosphate coating to the heated brake rotor 100. Thus, in some embodiments, the heating duration can refer to the period of time starting when the phosphate coating is applied to the brake rotor 100 and ending when the brake rotor is applied to the rinse component 230. To achieve a desired color, the heated brake rotor 100 with the applied phosphate coating may be allowed to settle or rest for a predetermined time interval prior to providing the brake rotor 100 the rinse component 230.

The rinse component 230 can be applied to the brake rotor 100 at different timing intervals to achieve a desired color of the brake rotor 100. For example, applying the rinse component 230 to the brake rotor 100 after a first predetermined time period can result in a yellow hue of the brake rotor 100. Applying the rinse component 230 to the brake rotor 100 after a second predetermined time (which is longer than the first predetermined time period) can produce in blueish hue on the brake rotor 100, and applying the rinse component 230 to the brake rotor 100 after third time predetermined period (which is longer than the second predetermined time period) can produce a purple hue on the brake rotor 100. In some embodiments, applying the rinse component 230 to the brake rotor 100 after another predetermined period of time can produce a goldish hue on the brake rotor 100.

After the rinsing stage, paint and/or other protective coatings (e.g., zinc coatings, water-based coatings, solvent-based coatings, etc.) can be applied to the brake rotor 100, if desired. If a paint coating is desired, the masking component 240 and paint application component 270 can operate together to selectively apply paint to desired regions of the brake rotor 100. For example, a masking component 240 may initially be applied to mask or block regions on the brake rotor 100 that are not intended to be painted (e.g., such as the engagement surface 106 of the brake rotor). After the desired regions are masked, the paint application component 270 can apply paint to the remaining regions of the brake rotor (e.g., such as the fastening surface 108).

In certain embodiments, the masking component 240 can include automated devices or machinery that are configured to apply masking structures 245 to shield portions of the brake rotor 100 and remove the masking structures 245 from the brake rotor 100 after the application of paint to the brake rotor 100. The masking structures 245 can be applied to the brake rotor 100 while a paint coating is applied on top of the phosphate coating on selected portions of the brake rotor 100. For example, a vehicle manufacturer or owner may desire to have the fastening surface 108 of the brake rotor 100 painted a certain color. Accordingly, the masking component 240 can apply a masking structure to the engagement surface 106 while the paint coating is applied to the fastening surface 108.

The structure or configuration of the masking structures 245 can vary. In some embodiments, a masking structure 245 can include a covering which can be constructed of various materials (e.g., plastics, wood, metal, rubber, etc.). For example, a covering may include structures or surfaces that block paint from being applied to the engagement surface 106. Openings included in the structures or surfaces of the covering can permit paint to be applied to the fastening surface 108. In some cases, the covering can be designed and shaped specifically to accommodate the structure, size, and/or dimensions of the brake rotor 100 to which the paint coating is being applied.

Other types of masking structures 245 also can be used. In some embodiments, the masking structures 245 additionally, or alternatively, can include adhesive strips, tapes, and/or other types of materials capable of preventing paint from being applied to the engagement surface 106. Additionally, in some cases, the masking structures 245 can be manually applied and removed from the brake rotors, rather than using automated devices or machinery to apply and remove the masking structures 245.

The masking structures 245 prevent certain portions of the phosphate coating included on the brake rotor 100 from becoming contaminated when a paint coating is applied. In certain scenarios, masking the engagement surface 106 can include situating a material or structure (e.g., a covering and/or adhesive strips) over the engagement surface 106 prior to applying a paint coating. Following the application of the paint coating by the paint application component 270, the masking structures 245 can be removed from the brake rotor 100 by the masking component 240 and/or by manually removing the masking structures 245.

The paint application component 270 can apply paint to the brake rotor 100. As mentioned above, in some scenarios, the paint application component 270 applies a paint coating to the fastening surface 108 of the brake rotor 100, while a masking structure 245 shields the engagement surface 106 of the brake rotor 100. The paint application component 270 can apply the paint coating using any paint application process (e.g., such by using paint spraying devices).

At this point, a phosphate coating and a paint coating has been applied to the brake rotor by the coating application system 200. In some cases, a zinc coating can be applied in lieu of, or in addition, to the paint coating.

In some cases, after the pretreatment and protective coatings are applied to the brake rotor a machining and/or tooling device can operate to remove portions of the coatings, along with portions of the brake rotor 100 itself (e.g., cast iron or steel that is part of the brake rotor). For example, in some instances, the machining and/or tooling device can operate to etch or remove material from brake rotor, which, in turn, can remove coatings applied to those portions of the brake rotor 100. In some instances, the machining and/or tooling device can be used to create openings in the brake rotor and/or apply designs or engravings to the brake rotor 100.

To illustrate the processing stages of the coating application system 200, consider an example in which it is desired to produce a brake rotor having a blue hue. During operation, the controller 210 can receive one or more inputs (e.g., via input interface 280) to select the desired color for the brake rotor 100 and/or customize settings of the coating application system 200 to produce the desired color. The controller 210 can instruct the heating component 226 to heat the liquid included in the cleansing component 225. The controller 210 can instruct the conveyor components 220 to obtain a brake rotor 100 and move the brake rotor 100 to the cleansing component 225 to clean and heat the brake rotor 100. Next, the controller 210 can instruct the conveyor components 220 (or other components) to place the brake rotor inside the cleansing component 225 for a specified duration (e.g., 2-10 minutes).

Following the cleaning and heating of the brake rotor 100, the controller 210 can instruct the conveyor component 220 to move the brake rotor 100 to the phosphate application component 260. The controller 210 can then instruct the phosphate application component 260 to apply the phosphate coating to the brake rotor 100. Prior to the rising stage, the controller 210 can allow the brake rotor 100 with the applied protective coating to sit or rest for a specified heating duration, thereby allowing for a reaction of the phosphate coating to the heated brake rotor.

After the protective coating is applied to the brake rotor 100, the controller 210 can instruct the conveyor component 220 to move the brake rotor 100 to the rinse component 230 and/or place the brake rotor 100 in a cooling liquid within the rinsing component 230. The time duration occurring between the application of the phosphate coating to the brake rotor and the insertion of the brake rotor into the cooling liquid can be selected to provide the blue hue.

Next, the controller 210 can instruct the conveyor component 220 to move the brake rotor 100 to the masking component 240 and can instruct the masking component 240 to apply one or more masking structures 245 to the brake rotor 100. The controller 210 can then instruct the conveyor component 220 to move the brake rotor 100 to the paint application component 270 and can instruct the paint application component 270 to apply a paint coating to the unmasked portions of the brake rotor 100. The controller 210 additionally, or alternatively, can cause the brake rotor to be positioned near components that apply other types of coatings (e.g., zinc coatings). The controller 210 can instruct the masking component 240 and/or paint application component 270 to remove the masking structure 245 from the brake rotor 100. Optionally, the controller 210 can instruct a machining or tooling device to remove material from the brake rotor 100. The brake rotor 100 can now be packaged for shipment. The controller 210 can repeat the process one or more times for one or more additional brake rotors 100.

In certain embodiments, the coating application system 200 can include additional components not described above. In some embodiments, the coating application system 200 also may include a mixing component 250 that operates to prepare the phosphate material that is applied by the phosphate application component 260. For example, the mixing component 250 may include a device or machine that operate to prepare and/or mix a phosphate coating. The mixing component 250 can combine materials (e.g., phosphate, iron phosphate, zinc phosphate, manganese phosphate, etc.) to produce a desired color of the phosphate coating for the brake rotor 100. The mixing component 250 additionally, or alternatively, vary a percentage of phosphate and/or phosphorus to be included in a coating solution.

The configuration of the coating application system 200 can be altered or adjusted in various ways as well. For example, in some embodiments, the manner in which heating is applied can vary. As explained above, one technique for applying heat is to utilize a heating component 226 to heat the liquid inside the cleansing component 225, thereby transferring thermal energy to a brake rotor 100 that is inserted into the liquid. The heating component 226 may be separate from the cleansing component 225 and may apply heat to the brake rotor in a separate processing stage. For example, the brake rotor 100 may be transported to a heating component 226 (e.g., an oven or other heating component) after cleansing stage and before the phosphate application stage. In other embodiments, the heating component 226 can be incorporated into the phosphate application component 260 and may heat the phosphate coating that is applied to the brake rotor 100. Other variations of the heating processes are also possible.

Figure 3:
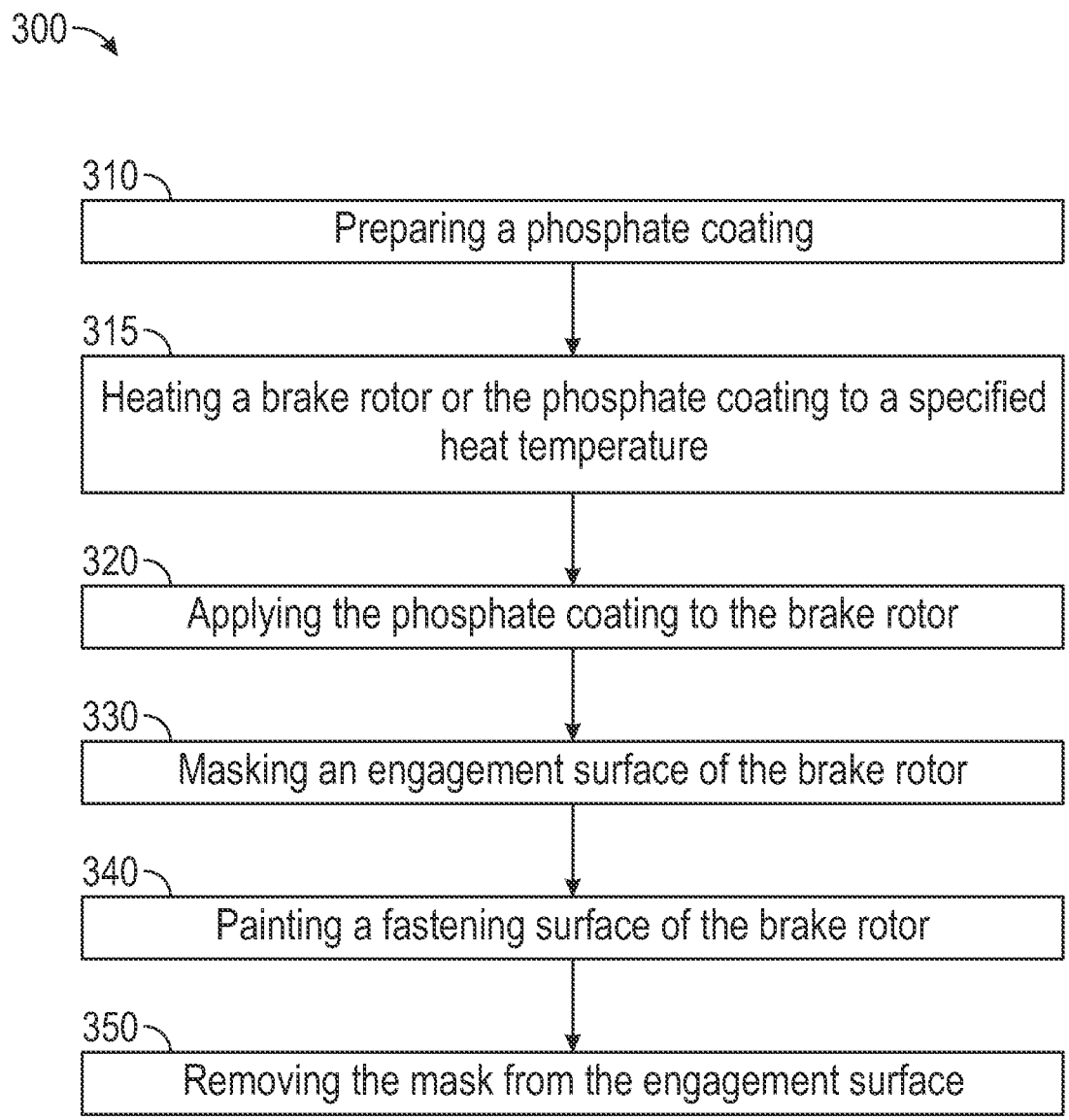
FIG. 3 is a method according to certain embodiments.

FIG. 3 corresponds to a method for coating a brake rotor 100. The method is merely exemplary and is not limited to the embodiments presented herein. The method can be employed in many different embodiments or examples not specifically depicted or described herein. In some embodiments, the steps of the method can be performed in the order presented. In other embodiments, the steps of the method can be performed in any suitable order. In still other embodiments, one or more of the steps of the method can be combined or skipped.

The method 300 can include a step 310 of preparing a phosphate coating. Preparing the phosphate coating can include selecting one or more phosphate materials (e.g., iron phosphate, manganese phosphate, and zinc phosphate, etc.) for the coating. Preparing the phosphate coating also can include selecting a percentage of phosphate and/or phosphorus to be included in a coating solution.

The method 300 can include a step 315 of heating the brake rotor or the phosphate coating to specified heat temperature, and a step 320 of applying the phosphate coating to the brake rotor 100. In some embodiments, heat can be applied to the brake rotor 100 prior to the phosphate coating being applied to the brake rotor 100. In other embodiments, heat can be applied to the phosphate coating before the phosphate coating is applied to the brake rotor 100. Regardless of whether heat is applied to the brake rotor or the phosphate coating, the brake rotor 100 can be allowed to rest for a specified heating duration after the phosphate coating is applied. As mentioned above, the material selection, temperature range, heating duration, and percentage of phosphate or phosphorus in the solution can be selected and varied to produce a desired color or appearance.

The manner in which the phosphate coating is applied can vary. In some cases, the phosphate coating can be sprayed onto the brake rotor. Additionally, or alternatively, the brake rotor 100 can be dipped into the phosphate coating and/or the phosphate coating can be poured onto the brake rotor 100.

The method 300 can include a step 330 of masking an engagement surface of the brake rotor. Masking the engagement surface 106 prevents the phosphate coating from becoming contaminated when a paint coating is applied. In certain scenarios, masking the engagement surface 106 can include situating a material or structure (e.g., a covering and/or adhesive strips) over the engagement surface 106 prior to applying a paint coating.

The method 300 can include a step 340 of applying a paint coating to a fastening surface of the brake rotor 100. After the engagement surface 106 is masked, a paint coating can be applied to the fastening surface 108 (e.g., using any paint application process such as spray paint, hand brush, etc.).

The method 300 can include a step 350 of removing the mask from the engagement surface.

The brake rotor resulting from method 300 can include a painted portion (e.g., the fastening surface 108) and a non-painted portion (e.g., the engagement surface 106). The color or appearance of the non-painted portion is still able to be customized using the coating preparation process to transform the color the phosphate coating.

In certain embodiments, one or all of the steps of method 300 can be performed by automated machinery (e.g., which may be included in an assembly or production line) associated with the coating application system 200. For example, in some cases, mixing equipment can be used to prepare the phosphate coatings, heating devices can be used to apply heat to the phosphate coatings, sprayer devices can be used to apply the phosphate and paint coatings, and various machinery can be used to apply and remove the masking structures. Some or all of the equipment can be controlled using a computer device that includes one or more processors (e.g., CPUs) and one or more storage devices (e.g., memory devices). The processor can execute instructions and/or programs for controlling the equipment (e.g., mixing equipment, heating devices, sprayer devices, masking structures, etc.).

In certain embodiments, the techniques described herein can be used for other types of pretreatment coatings (in addition to phosphate-based and/or phosphorous-based coatings). For example, in some scenarios, the pretreatment coating can include zinc-based coatings, aluminum-based coatings, and/or other types of coatings. The same techniques and methods described above can be used to apply these coatings to brake rotors.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in any methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in ways other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method for coating a brake rotor, the method comprising:
    determining a desired color of a phosphate coating for a brake rotor;
    providing, to a coating application system, a brake rotor that includes a fastening surface and an engagement surface;
    preparing the phosphate coating based, at least in part, on the desired color of the phosphate coating;
    applying, using the coating application system, heat to the brake rotor or the phosphate coating based, at least in part, on the desired color of the phosphate coating;
    applying, using the coating application system, the phosphate coating to the fastening surface and the engagement surface of the brake rotor;
    applying a masking structure to the engagement surface of the brake rotor; and
    applying a paint coating to the fastening surface of the brake rotor while the masking structure is applied to the engagement surface of the brake rotor.

2. The method of claim 1, further comprising obtaining, via an input interface, inputs specifying the desired color of the phosphate coating.

3. The method of claim 2, wherein the inputs specify one of the following: a blue color, a gold color, a yellow color, a purple color.

4. The method of claim 1, further comprising:
    selecting a composition of the phosphate coating based on the desired color of the phosphate coating;
    selecting a heating temperature for heating the brake rotor or the phosphate coating based on the desired color of the phosphate coating; and
    selecting a heating duration for the brake rotor or the phosphate coating based on the desired color of the phosphate coating.

5. The method of claim 4, wherein selecting the composition of the phosphate coating includes:
    selecting one or more phosphate materials for the phosphate coating, the one or more phosphate materials being selected from the group consisting of: iron phosphate, manganese phosphate, and zinc phosphate; and
    selecting a percentage of phosphate for the phosphate coating.

6. The method of claim 5, wherein the percentage of phosphate includes at least 4% of phosphorus.

7. The method of claim 4, wherein the heating temperature is at least 85 degrees Fahrenheit.

8. The method of claim 4, wherein the heating duration is approximately 2 minutes.

9. The method of claim 4, wherein the method further comprises:
selecting a pH level for a liquid that is applied to the brake rotor, wherein the pH selected for the liquid is in a range of 7-9.

10. The method of claim 1, wherein applying the phosphate coating includes at least one of:
placing the brake rotor in a container with the phosphate coating to apply the phosphate coating to brake rotor; or
spraying the phosphate coating onto the brake rotor.

11. The method of claim 1, wherein applying the masking structure to the engagement surface includes applying a covering or adhesive strip to the engagement surface.

12. The method of claim 1, further comprising:
removing, using a machining or tooling device, material from the brake rotor after phosphate coating and the paint coatings are applied to the brake rotor.

13. A system for applying a coating to a brake rotor, comprising:
a controller for a coating application system that is configured to apply a phosphate coating having a desired color to a brake rotor;
means for providing a brake rotor that includes a fastening surface and an engagement surface;
means for applying heat to the brake rotor or the phosphate coating based, at least in part, on the desired color of the phosphate coating;
means for applying the phosphate coating to the fastening surface and the engagement surface of the brake rotor, wherein the phosphate coating is prepared based, at least in part, on the desired color of the phosphate coating;
means for applying a paint coating to the fastening surface of the brake rotor, wherein the paint coating is applied to the fastening surface while a masking structure is applied to the engagement surface of the brake rotor.

14. A method for coating a brake rotor, the method comprising:
determining a desired color of a pretreatment coating for a brake rotor;
providing, to a coating application system, a brake rotor that includes a fastening surface and an engagement surface;
preparing a pretreatment coating based, at least in part, on the desired color of the pretreatment coating;
applying, using the coating application system, heat to the brake rotor or the pretreatment coating based, at least in part, on the desired color of the pretreatment coating;
applying, using the coating application system, the pretreatment coating to the fastening surface and the engagement surface of the brake rotor;
applying a masking structure to the engagement surface of the brake rotor; and
applying a protective coating to the fastening surface of the brake rotor while the masking structure is applied to the engagement surface of the brake rotor.

* * * * *